United States Patent Office 3,530,347
Patented Sept. 22, 1970

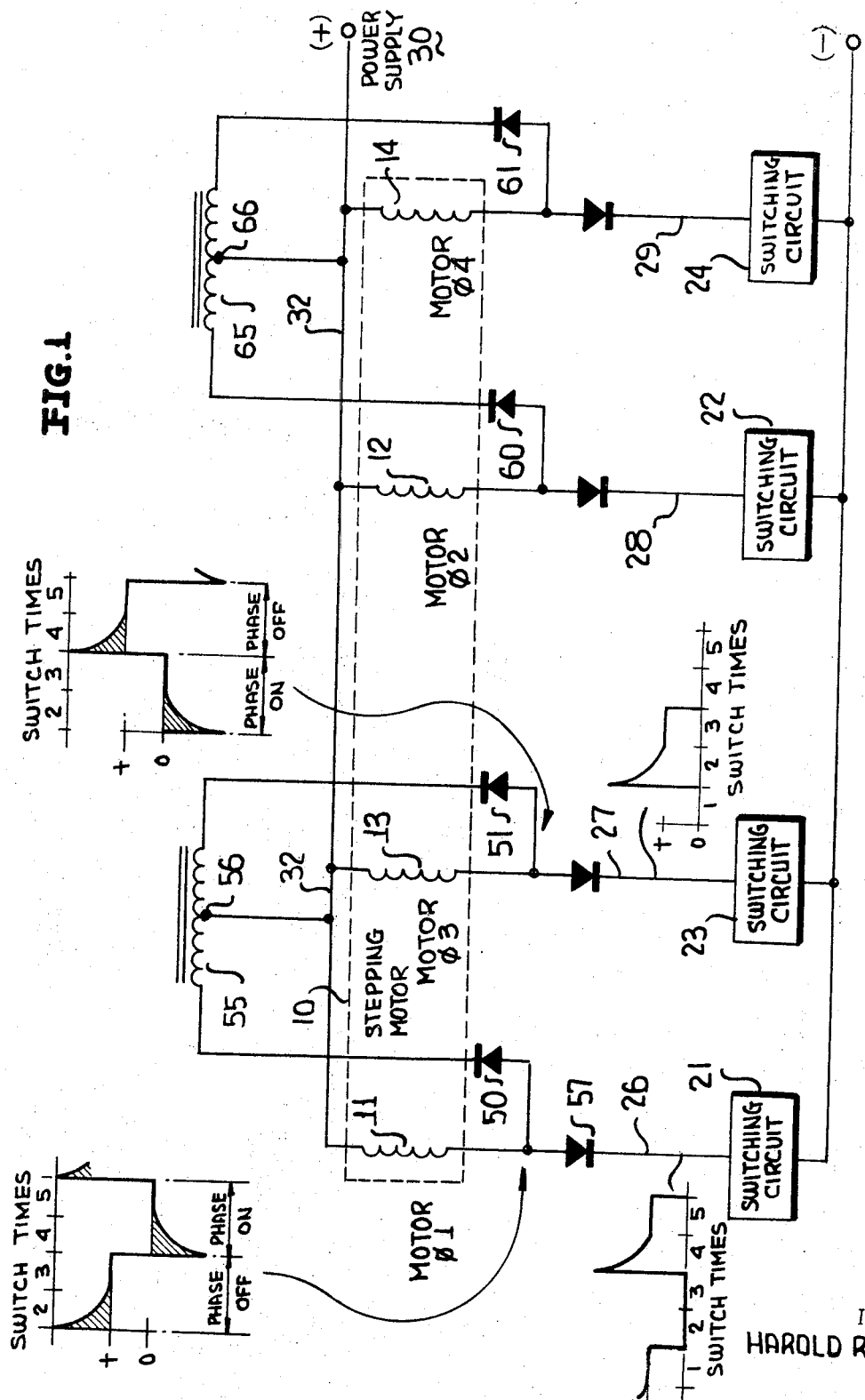

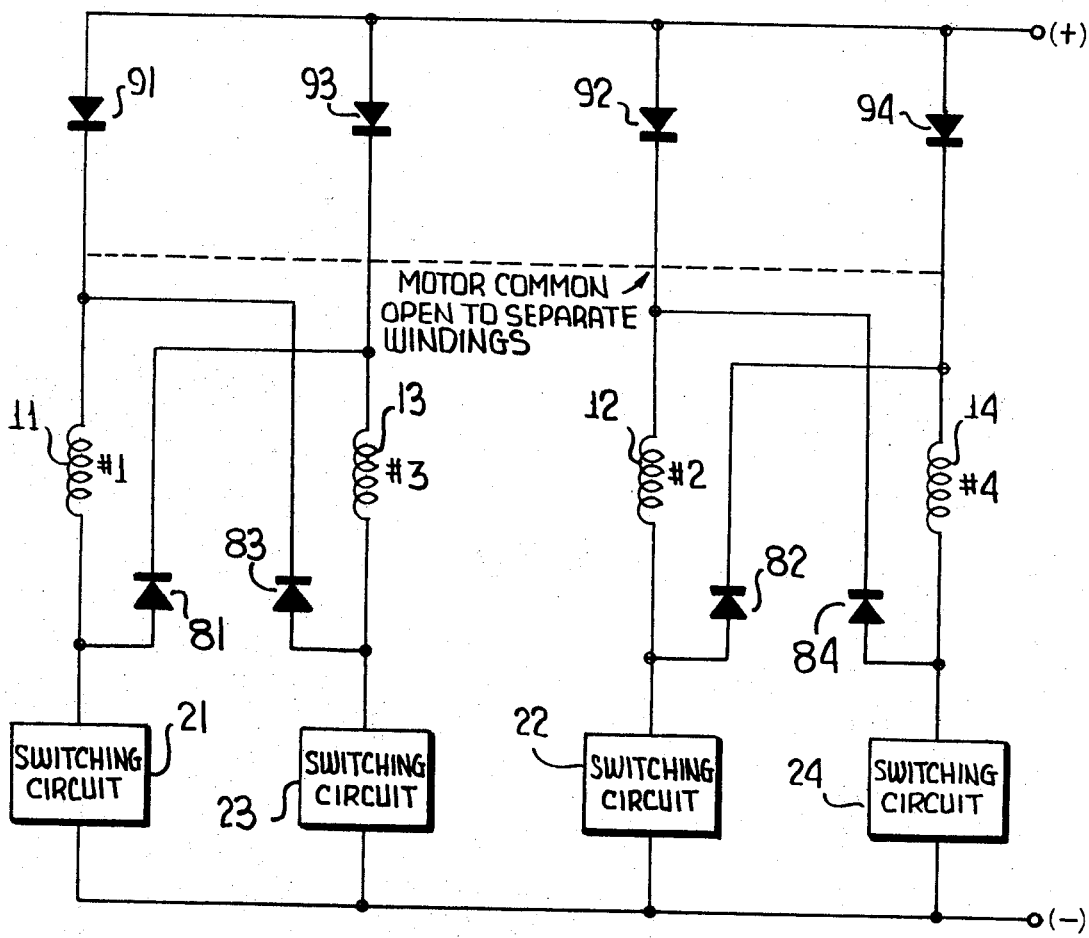

3,530,347
ENERGY TRANSFER MEANS FOR STEPPING MOTORS
Harold R. Newell, South Newbury, N.H., assignor to Mesur-Matic Electronics Corporation, Warner, N.H., a corporation of Delaware
Continuation-in-part of application Ser. No. 581,334, Sept. 22, 1966. This application Jan. 28, 1969, Ser. No. 794,563
Int. Cl. H02k 37/00
U.S. Cl. 318—138          7 Claims

ABSTRACT OF THE DISCLOSURE

In control circuitry for exciting the field windings of a multi-phase stepping motor, in which energizing currents are applied to the field windings of the motor in a predetermined sequential switching format so that each winding is energized during certain preselected time increments of the format and de-energized during certain other preselected time increments of the format, a modification is provided by which the reverse voltage accompanying the collapse of the magnetic field about a de-energized winding is applied to another winding at the moment the latter winding is to be energized in the normal sequence of the switching format, to provide additional energizing current to the winding at that moment.

CROSS-REFERENCE TO RELATED APPLICATION

The present application is a continuation-in-part of my copending application Ser. No. 581,334 (now Pat. No. 3,444,447), entitled "Multiphase Step Motor Control Circuits," filed Sept. 22, 1966, repeating that portion of the earlier application relating to stepping motor driver circuitry for utilizing the reverse voltage surge across the field windings upon collapse of the magnetic field to enhance magnetic field buildup in newly energized windings (FIGS. 7 and 8 and accompanying description of the copending application), and elaborating upon various facets of the operation of that circuitry. The present application claims subject matter not claimed in said copending application with respect to that circuitry.

BACKGROUND OF THE INVENTION

The present invention relates generally to driving circuits for stepping motors, and more particularly to apparatus for aiding the buildup and decay of the magnetic field of the stepping motor windings in a motor driver system.

In a typical multi-phase stepping motor, operation to produce stepping or incremental rotation of the motor shaft through discrete sequential equiangular orientations is achieved by sequentially switching the D-C supply voltage across each of the several windings for equal increments of time. To that end, a four-phase stepping motor having successive field windings, A, B, C, D, associated respectively with the four phases, for example, would have a driving voltage (or current) selectively applied to the windings in the format A, B, C, D, A, B, C, D, A, B, and so forth, the energization intervals for the windings being of uniform length. If desired, a variation of the sequential energization of the windings may be utilized to obtain some improvement in the stepping motor operation by increasing the shaft torque, by application of the energizing voltage to two windings at a time in the equal time interval sequence. An example of a suitable double excitation sequence is the format A+B, B+C, C+D, D+A, A+B, etc.

As each motor winding is driven in the sequential switching format, a finite time interval is required for the magnetic field to build up about that excited winding and another finite time interval is required for collapse of the magnetic field when the winding is de-energized. During high speed switching of the stepping motor, that is, excitation of the windings in the sequential switching format in rapid fashion, the rapidly decaying magnetic field about a winding whose excitation has been removed causes a relatively high voltage spike of opposite polarity to be developed across the winding. This is simply the result of the tendency of any inductor to produce a voltage in opposition to any sudden change in the current flowing through that inductor. In the typical prior art stepping motor driving circuit, the reverse voltage spike is clamped to a sufficiently low level to protect the driving transistors from breakdown, but this constitutes an energy or power loss that is dissipated in the form of heat in the windings and associated components of the driving circuit.

It is the principal object of the present invention to provide auxiliary apparatus for the driving circuit of a stepping motor by which energy that would ordinarily be wasted as a result of this reverse voltage surge is utilized to aid the building of the magnetic field of one of the other windings of the motor.

SUMMARY OF THE INVENTION

According to the present invention, the reverse voltage surge that normally accompanies the collapse of the magnetic field about a de-energized winding is applied to the winding of a complementary phase at the moment that the complementary winding is normally excited, to enhance the buildup of the magnetic field of that winding and thereby to provide increased torque on a motor shaft. To that end, each winding is coupled to the winding of a complementary phase by an actual physical connection, that is, by other than magnetic coupling, so as to inject the reverse voltage from the de-energized winding at the proper point of application to the winding that is presently being excited. By "complementary phases" or "complementary windings" is meant a pair of phases whose respectvie windings are excited in a format in which one winding is "off" while the other winding is "on," and vice versa, so that complementary operation is achieved.

It has been found that use of an embodiment of the present invention in the driver circuit of a conventional commercially available stepping motor, when operated at high stepping rates, results in a remarkable increase in the torque output of the motor, up to approximately 25 percent, with no increase in the amount of power taken from the power source.

BRIEF DESCRIPTION OF THE DRAWINGS

The above and still further objects, features and attendant advantages of the present invention will become apparent from a consideration of the following detailed description of certain preferred embodiments thereof, especially when taken in conjunction with the accompanying drawings in which:

FIG. 1 is a circuit diagram of a preferred embodiment of the present invention for utilizing the reverse voltage surge across the field windings upon collapse of the magnetic field to enhance the magnetic field buildup about others of the windings;

FIG. 2 is a circuit diagram of an alternative embodiment of the present invention; and FIG. 3 is a tabulation of an exemplary switching sequence for the driver circuits of FIGS. 1 and 2.

DESCRIPTION OF THE PREFERRED EMBODIMENT

Referring now to FIG. 1, the motor windings of a four-phase stepping motor 10 include winding 11, associated with motor phase number 1; winding 12, associated with motor phase number 2; winding 13, associated with motor phase number 3; and winding 14, associated with motor phase number 4. As shown in the drawing and as will subsequently be described in greater detail, windings 11 and 13 are arranged and adapted for excitation as complementary phases, as are windings 12 and 14.

Typically, in a conventional stepping motor arrangement, the windings are connected to the appropriate switching portions or phase activation circuitry of a motor driver circuit, and together with the driver are connected across the terminals of a suitable power supply. The rated voltage of the power supply will depend upon the expected power to be taken by the windings and the switching circuitry during operation, and thus to a great extent, upon the specific active components in the driver circuit. In the conventional portion of the circuit shown in FIG. 1, winding 11 is connected to a switching circuit 21 of the overall motor driving circuit via a conductor 26, winding 12 to switching circuit 22 via conductor 28, winding 13 to switching circuit 23 via conductor 27, and winding 14 to switching circuit 24 via conductor 29. The other end of each winding is connected in common to the same end of the other windings, and to an appropriate terminal of the power supply 30 via a motor common lead 32, while the motor driver circuit is connected in appropriate fashion to the other terminal of the power supply or to a point of reference potential. A suitable driving circuit and the specific switching circuitry therefor is disclosed in my aforementioned copending application Ser. No. 581,334, of which the present application is a continuation-in-part. It is sufficient to note here that the function of each switching circuit of the overall driver is to connect its associated motor winding in a completed circuit path across the power supply terminals, or to otherwise excite the winding, at an appropriate timed interval in the sequential switching logic format.

An example of the switching format or switching sequence for forward or reverse motor operation for the circuit of FIG. 1 is shown in FIG. 3. For motor operation in the arbitrarily selected forward sense, phases 1 and 2 are turned "on" by their respective switches 21 and 22 (i.e., are excited or energized) during the first timing interval, while motor phases 3 and 4 are maintained in the "off" condition (i.e., unexcited). During the second timing interval, phase 1 is turned off, phase 2 is maintained on, phase 3 is turned on, and phase 4 is maintained off. The phase excitation continues in the manner shown in the switching sequence diagram of FIG. 3, with two phases on and two phases off in each switching interval, and the phases operated in complementary pairs such that phase 1 is on while phase 3 is off, and when phase 3 is turned on, phase 1 is turned off. The same complementary operation occurs for phases 2 and 4, by virtue of the switching sequence of the motor driver circuit.

The waveforms occurring during operation of phases 1 and 3 at various points in the circuit are shown in FIG. 1. When switch 1 is turned on during time interval number 1, the full voltage of the power supply, or approximately so, and any other voltage that may be applied as a result of the specific operation of switching circuit 21 (with reference particularly to the energy storage arrangement set forth in aforementioned copending application 581,334), is applied across the ends of winding 11. After a finite period, the magnetic field about winding 11 builds up to a maximum value, and the stepping motor shaft undergoes an incremental rotation. During the next timing interval, designated 2 in FIG. 3, switching circuit 23 is actuated as switching circuit 21 is turned off so that winding 13 is excited at the very moment that winding 11 is de-energized. As a result of the collapsing magnetic field about winding 11 that occurs the moment that winding is de-energized, a reverse voltage surge is rapidly developed across winding 11 and in the conventional driving circuit. This voltage spike is clamped or limited to a sufficiently low level to protect the driving transistors (in the switching circuits of the motor driver) from breakdown. The reverse voltage, i.e., a voltage of opposite polarity to that which produced the original current flow through the winding, may be and generally is of higher level than the power supply output voltage.

In accordance with the present invention, the conventional motor driver circuit is modified by inclusion of a pair of diodes 50 and 51 and a low loss autotransformer (or simply, autoformer) 55 in a circuit in which the cathodes of the two diodes are connected to respective ends of the autoformer winding, and the anodes to an appropriate respective end of the windings associated with motor phases 1 and 3. The center tap or movable slider 56 of low loss autoformer 55 is connected to the positive voltage terminal of power supply 30 via the common lead 32 of the motor windings. A corresponding circuit arrangement is provided by diodes 60 and 61 and low loss autoformer 65 for motor phases 2 and 4.

It is to be emphasized that practicing the present invention in its form presently being described, requires only that appropriate connections be made to the winding-driver circuit path and to the common lead of the motor of an existing conventional driving arrangement for the motor. That is to say, a very simple and slight variation of commercially available stepping motors with their driver circuits is all that is necessary to obtain the advantages of the present invention, although for completely newly produced driver-motor systems the required circuitry is conveniently incorporated during production.

As shown in the idealized waveforms of FIG. 1, switching circuit 21 is maintained actuated during interval 1 as it was during the immediately preceding interval, and is cut off at the conclusion of interval 1. The initial voltage rise above the power supply level upon each initial actuation of a switching circuit is the result of the release of energy stored in the switching circuit during a preceding timing interval, at the precise moment of initial actuation of the switching circuit, as is explained in detail in conjunction with exemplary embodiments of the driver circuitry set forth in my aforementioned copending application 581,334. This energy storage is not essential to the practice of the present invention and, hence, need not be further discussed at this time. It suffices to say that the waveforms indicative of reverse voltage surge and of energy transfer between windings are completely representative of levels storage that may be available within the driver circuit.

Returning now to a description of operation, upon cutting off switch 21, the formerly completed circuit path containing winding 11 is now opened, but the current through that winding cannot immediately cease, and a reverse voltage spike is generated across winding 11 with the collapse of the magnetic field. The lower end of winding 11 as depicted in FIG. 1 goes more positive than the upper end of the winding (which is connected to the positive terminal of the power supply), as indicated by the initial portion of the voltage waveform at that point in the circuit for the period designated "phase off." This voltage spike is passed by diode 50 and is inverted by that portion of autoformer 55 through which it is applied with proper polarity to winding 13 (phase 3) at the very instant switching circuit 23 is actuated to excite that winding via the power supply. This transferred energy is shown in the "phase on" portion of the waveform associated with winding 13. Accordingly, the energy transferred from one winding to its complementary winding upon decay of the magnetic field is of the appropriate sense to aid the buildup of the magnetic field about the latter winding by adding to the current in that winding from the power supply. On the other hand, normal voltage or current transfer directly from the power supply to the complementary winding via the excited winding is prevented by the direction in which the diodes 50 and 51 are poled.

A similar transfer of energy is effected when, at the conclusion of timing interval number 3, switching circuit 23 is cut off and a reverse voltage spike is generated by winding 13 accompanying the collapse of the magnetic field about that winding. Here, the voltage is transferred via diode 51 and is inverted in polarity by the autoformer prior to application to winding 11 at the beginning of timing interval number 4. This energy transfer follows precisely the complementary operation of the switching circuits and the motor phases, and results in a considerable improvement in the torque output of the stepping motor, particularly at the higher stepping rates, over that available without the reverse voltage energy transfer.

The same energy transfer operation occurs for windings 12 and 14 during the winding switching sequence governing excitation of motor phases 2 and 4. Hence, no additional explanation of operation as regards those phases is deemed necessary.

From the foregoing it wil be appreciated that the present invention takes advantage of the phenomenon occurring in a digital step motor when the current flowing in a winding is interrupted, namely, the high voltage, of opposite polarity to that producing the original current flow, which is generated by the collapsing magnetic field of a phase that has been cut off. Efficient operation of step motors requires that the field be allowed to collapse as swiftly as possible; yet, in those motor driver circuits where transistor switches are used for commutating the phase windings, such switches are subject to destruction by the high reverse voltage surge accompanying the rapidly collapsing magnetic field. The usual practice has been to provide some means for limiting the voltage level otherwise applied to the transistors, by dissipating the energy contained in the collapsing magnetic field. As a result, this energy was lost as heat, and the speed at which the magnetic field would collapse without the energy dissipating means, was correspondingly reduced. In conventional step motors operating at high rates, then, the motor acts as a pump in supplying a considerable percentage of the energy from the power source to the voltage surge (or spike) limiting means.

Quite clearly, my invention serves to use the greater portion of this otherwise lost energy to promote the operation of the motor and to increase its efficiency by applying this reverse high voltage surge to the complementary winding. While some form of voltage limiting means is still required, to prevent application of high level voltage to transistors in the switching circuit, the magnitude of the voltage involved is far less than in conventional driver circuits because of the energy transfer here. As noted earlier, during buildup and decay of the magnetic fields in a conventional step motor to which my supplemental circuitry has been added, the torque output of the motor at high stepping rates is markedly increased, up to 25 percent in many of the units tested, without any increase in power from the power source over that required prior to addition of my torque-boosting or energy transfer circuitry.

In a second, but generally less effective, embodiment of my invention, shown in FIG. 2, the switching circuits of the driver for a four-phase synchronous step motor are again designated 21, 22, 23 and 24, associated with motor windings 11 (phase No. 1), 12 (phase No. 2), 13 (phase No. 3), and 14 (phase No. 4), respectively. Complementary phases are again shown in side-by-side relationship. Thus, winding 11, driven by switching circuit 21, is adjacent winding 13, driven by switching circuit 23, with a similar driving arrangement for complementary phases 2 and 4.

This circuit is effective to couple the reverse voltage across a winding from which driving excitation has just been removed, to its respective complementary winding. Assume, for example, that winding 13 has just been de-energized, in consequence of which a reverse voltage spike (i.e., a voltage having a polarity opposite that shown at the voltage supply terminals) is developed across the winding. That spike is applied via diode 83, now biased in the forward direction (as a result of the polarity of the reverse voltage) from the junction of winding 13 and switching circuit 23, through the junction of winding 11 and diode 91, to complementary winding 11. Diode 91 prevents the voltage spike from being applied to the circuit power supply in opposition to the voltage normally appearing at that power supply terminal, or to any other winding of the motor. Application of the voltage spike to winding 11 occurs simultaneously with its normal energization (also as shown in FIG. 3) to increase the initial current through that winding, and thereby to enhance the buildup of the magnetic field associated with that winding. Similarly, the reverse voltage surge accompanying the collapse of the magnetic field about winding 11, when it is turned off, is applied to complementary winding 13 just as the latter is excited.

A corresponding set of events occurs during operation of complementary phases 2 and 4. In the present arrangement, the complementary windings are placed at right angles to one another to prevent magnetic coupling therebetween. In addition, the common lead of the step motor windings is opened to separate the windings, as indicated by the dotted lines in FIG. 2.

I claim:

1. In control circuitry for exciting the field windings of a multi-phase stepping motor, in which energizing currents are applied to the field windings of the motor in a predetermined sequential switching format so that each winding is energized during certain preselected time increments of said switching format and de-energized during certain other preselected time increments of said switching format, the improvement comprising means for applying energy obtained from the collapsing magnetic field about a field winding when that winding is de-energized to another winding that is to be energized during the next succeeding time increment according to said switching format, to provide additional energizing current to said another winding at the moment of normal energization thereof, said means including a pair of inductively coupled coils each connected in parallel with a different one of said windings and means for preventing flow of said energizing currents through each said coil during energization of its associated winding.

2. The invention according to claim 1 wherein said control circuitry includes a driver circuit having switching circuits connected to a power supply and to respective windings of said motor to provide a switching format in which said windings are excited in pairs of complementary windings, such that one winding of a pair of complementary windings is energized while the other winding of that pair is de-energized, and when said one winding is de-energized said other winding is energized.

3. The invention according to claim 2 wherein each of said windings has an end connected in common with the same end of the other windings for connection to one terminal of said power supply; and wherein said coils comprise an autotransformer having a center tap connected to said common end of said windings, and having its ends connected respectively to the ends of the respective pair of complementary windings opposite said common end.

4. The invention according to claim 3 wherein said means for preventing direct application of electrical energy comprises a pair of diodes connected to said complementary windings for each pair of such windings, said diodes normally reverse biased by said power supply, said ends of said autotransformer connected to said ends of said complementary windings opposite said common end via respective ones of said diodes, said energy obtained from said collapsing magnetic field being in the form of a voltage spike of opposite polarity to the voltage produced across said windings by said power supply, and being effective to forward bias a respective one of said diodes connected directly to the winding whose magnetic field is collapsing, said autotransformer for inverting the polarity of said voltage spike and applying it to the complementary winding via the other of said diodes.

5. The invention according to claim 2 wherein said coils comprise an autotransformer having a center tap connected in common to the same end of all said windings, and having its ends connected respectively to the ends of the respective pair of complementary windings opposite said same end.

6. The invention according to claim 2 wherein said means for preventing direct application of electrical energy comprises a pair of diodes, each of said diodes connected from one end of a respective one of said complementary windings to the other end of the other complementary winding, said diodes connected relative to said power supply to be normally reverse biased thereby and responsive to the voltage spike, of opposite polarity to said power supply, generated across a winding accompanying the collapsing magnetic field thereabout for passing said voltage spike to the complementary winding simultaneously with the normal energization of the latter winding in said switching format.

7. In control circuitry for exciting the field windings of a multi-phase stepping motor, in which energizing currents are applied to the field windings of the motor in a predetermined sequential switching format so that each winding is energized during certain preselected time increments of said switching format and de-energized during certain other preselected time increments of said switching format, the improvement comprising means for applying energy obtained from the collapsing magnetic field about a field winding when that winding is de-energized to another winding that is to be energized during the next succeeding time increment according to said switching format, to provide additional energizing current to said another winding at the moment of normal energization thereof, said means including inductively coupled electromagnetic means connected in parallel with both said windings and means for preventing said energizing currents from flowing in said electromagnetic means during energization of the winding with which said electromagnetic means is connected in parallel.

References Cited

UNITED STATES PATENTS 3,402,334   9/1968   Newton _____ 318—138

G. R. SIMMONS, Primary Examiner

U.S. Cl. X.R.

318—439